US009327945B2

(12) United States Patent
Boisson et al.

(10) Patent No.: US 9,327,945 B2
(45) Date of Patent: May 3, 2016

(54) DEVICE FOR HANDLING A LOAD

(71) Applicant: AIRCELLE, Gonfreville l'Orcher (FR)

(72) Inventors: Pascal Boisson, Fourmetot (FR); Patrice Raymond, La Remuee (FR)

(73) Assignee: AIRCELLE, Gonfreville l'Orcher (FR)

( * ) Notice: Subject to any disclaimer, the term of this patent is extended or adjusted under 35 U.S.C. 154(b) by 0 days.

(21) Appl. No.: 14/194,942

(22) Filed: Mar. 3, 2014

(65) Prior Publication Data

US 2014/0178145 A1 Jun. 26, 2014

Related U.S. Application Data

(63) Continuation of application No. PCT/FR2012/051948, filed on Aug. 28, 2012.

(30) Foreign Application Priority Data

Sep. 2, 2011 (FR) ..................................... 11 57827

(51) Int. Cl.
*F16B 23/00* (2006.01)
*B66C 1/66* (2006.01)

(52) U.S. Cl.
CPC ........................................ *B66C 1/66* (2013.01)

(58) Field of Classification Search
CPC .......................................................... B66C 1/66
USPC ................................. 411/8–14, 400; 294/215
IPC .......................................................... B66C 1/66
See application file for complete search history.

(56) References Cited

U.S. PATENT DOCUMENTS

| | | | | | |
|---|---|---|---|---|---|
| 1,510,978 | A | * | 10/1924 | Conklin | 411/400 |
| 3,158,051 | A | * | 11/1964 | Demart | 81/53.2 |
| 3,183,762 | A | * | 5/1965 | Poupitch | 411/12 |
| 4,315,651 | A | * | 2/1982 | Endicott et al. | 294/82.17 |
| 5,248,176 | A | * | 9/1993 | Fredriksson | 294/215 |

FOREIGN PATENT DOCUMENTS

| | | | |
|---|---|---|---|
| FR | 2 880 084 | A1 | 6/2006 |
| JP | 2003-155188 | A | 5/2003 |
| JP | 2007-238219 | A | 9/2007 |

OTHER PUBLICATIONS

International Search Report issued Oct. 9, 2012 in International Application No. PCT/FR2012/051948.

* cited by examiner

*Primary Examiner* — Gary Estremsky
(74) *Attorney, Agent, or Firm* — Burris Law, PLLC

(57) ABSTRACT

A device for handling a load provided with a thread includes a screw assembly equipped with a gripper and capable of connecting to the load, a first screwing indicator secured to the screw assembly, a second screwing indicator movable in translation relative to the first screwing indicator, and a spring. In particular, the spring is inserted between the first screwing indicator and the second screwing indicator and has an effect of returning the second screwing indicator such that the second screwing indicator abuts against the load, so that a coincidence between the first and second screwing indicator indicates a sufficient screwing of the device onto the load.

5 Claims, 3 Drawing Sheets

DEVICE FOR HANDLING A LOAD

CROSS-REFERENCE TO RELATED APPLICATIONS

This application is a continuation of International Application No. PCT/FR2012/051948, filed on Aug. 28, 2012, which claims the benefit of FR 11/57827, filed on Sep. 2, 2011. The disclosures of the above applications are incorporated herein by reference.

FIELD

The present disclosure relates to a device for industrial handling of a load.

BACKGROUND

The statements in this section merely provide background information related to the present disclosure and may not constitute prior art.

Generally, during handling operations, loads are moved by means of a device for holding the load attached to the end of a lifting sling connected to a lifting device such as a winch, ensuring the lifting of a load from a low to a high position and vice versa.

These holding devices generally comprise a lifting shackle or a lifting ring well known to those skilled in the art.

The lifting shackles or rings constitute a lifting accessory associated with the lifting device and are intended to ensure the connection between the lifting sling connected to the winch and the item to be handled.

They are designed and shaped to withstand the work generated by the vertical movement of the load which they support.

A lifting ring generally comprises a substantially U-shaped ring, closed by a base on which a threaded bore is positioned, receiving a screw on which the load to be handled is fixed.

This fixation consists in screwing directly on the upper face of the load. This screwing is typically performed manually by an operator, who screws the lifting ring on the load, then connects the free end of the sling to the U-shaped part of said ring to cause the load to move when the winch is operated.

Once the lifting ring is screwed on the load, the operator must ensure that the screw is sufficiently anchored in the load before operating the winch.

This control is typically performed according to the manufacturer's recommendations regarding the anchoring length required depending on the weight of the item to be handled.

However, as they are performed manually, screwing and controlling may involve certain risks, such as the risk of not anchoring the screw deep enough into the load to be handled, which can cause said load to pull away from the lifting ring.

SUMMARY

The present disclosure provides a device for handling a load provided with at least one thread comprising a screw assembly provided with gripping means and capable of connecting to said load, said device being characterized in that it comprises:

- a first screwing indicator element secured to said screw assembly;
- a second screwing indicator element that is movable at least in translation relative to said first member, and
- resilient return means,

- said resilient return means being inserted between the first screwing indicator element and the second screwing indicator element and acts to return the second screwing indicator element to have it abut against the load, so that a coincidence between the two screwing indicator elements indicates a sufficient screwing of the handling device onto said load.

The present disclosure makes it possible to quickly and visually check that the anchoring of the screw into the load is deep enough.

When the screwing indicator elements coincide, the operator is assured that the load is properly secured to the lifting ring, so that it will not tear under normal conditions of use of the winch. When the screw is, however, not sufficiently anchored in the load to be lifted, when, for example, the operator has not screwed the screw deep enough or when the screw has accidentally broken loose from the load hole, the screwing indicator elements do not match; the operator upon a simple visual check is then quickly aware that the anchoring of the screw is not deep enough and that, as a consequence, the load is not firmly held and may tear when it is lifted and moved upward.

Advantageously, the second screwing indicator element contains resilient return means.

Owing to this feature of the present disclosure, these resilient return means are protected from damage when the load is lifted or moved.

Furthermore, according to another feature of the present disclosure, the second screwing indicator element comprises at least an area shaped to completely cover the first screwing indicator element when said second screwing indicator element abuts against the load, and the screwing between the handling device and said load is sufficient.

This arrangement provides through a quick visual check that the lifting ring is firmly secured to the load.

According to another feature of the present disclosure, the handling device comprises gripping means forming a substantially U-shaped ring closed by a base, said base being fitted with at least one threaded hole adapted to receive at least one screw on the body of which the first screwing indicator element is mounted.

According to another form of the device according to the present disclosure, the first and second screwing indicator elements are of different colors.

This arrangement has the advantage of allowing the user through a quick visual check to establish whether the ring is properly fixed to the load to be moved. If the color representing the first screwing indicator element remains visible when the lifting ring has been mounted on the load to be moved, the user is immediately informed of the improper screwing of said ring on said load.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
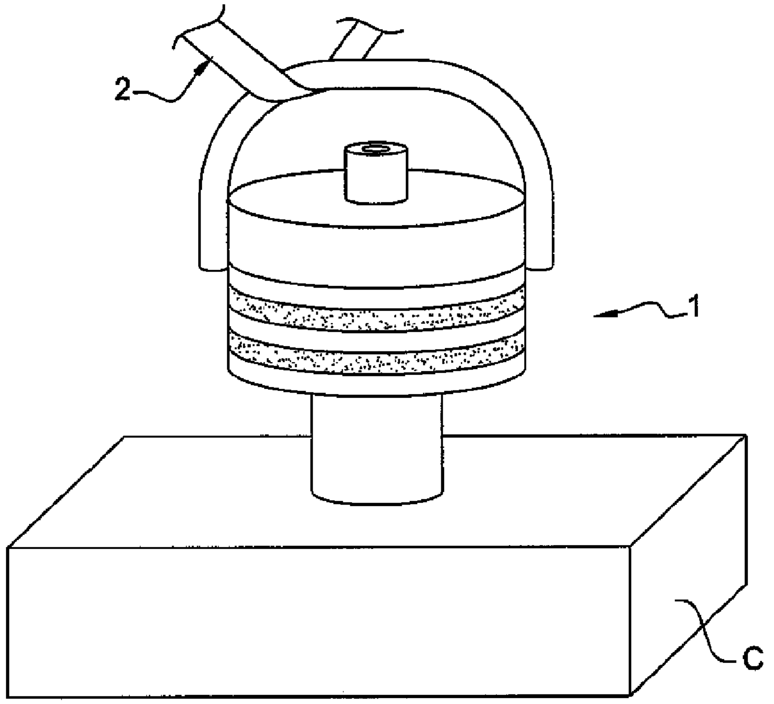
FIG. 1 shows a perspective view of the handling device according to the present disclosure connected to a lifting sling from one end and to the load to be handled from the other end.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In this description, words such as "upper" and "lower" are used with reference to the position of the handling device when the latter is upright, that is to say screwed or ready to be screwed onto the load to be handled.

Referring to FIG. 1, a handling device 1 according to the present disclosure ensures the connection between a lifting sling 2 and the load C to be handled.

The lifting sling is connected to a lifting device (not shown) such as, for example, a winch. A lifting sling is typically formed by one or more cable(s) connected to the handling device according to the present disclosure. Such a cable is, in a known manner, made of steel.

In general, when it is desired to lift and move a load from a low to a high point, an operator screws the lifting ring directly on the upper face of the load fitted with one or more threaded hole(s). The lifting ring, hitherto only connected to the load, is now ready to receive a lifting sling intended to be connected to a lifting device.

The handling device 1 according to the present disclosure is adapted to withstand the traction and is typically made of steel or any other traction-resistant material known to those skilled in the art.

Figure 2:
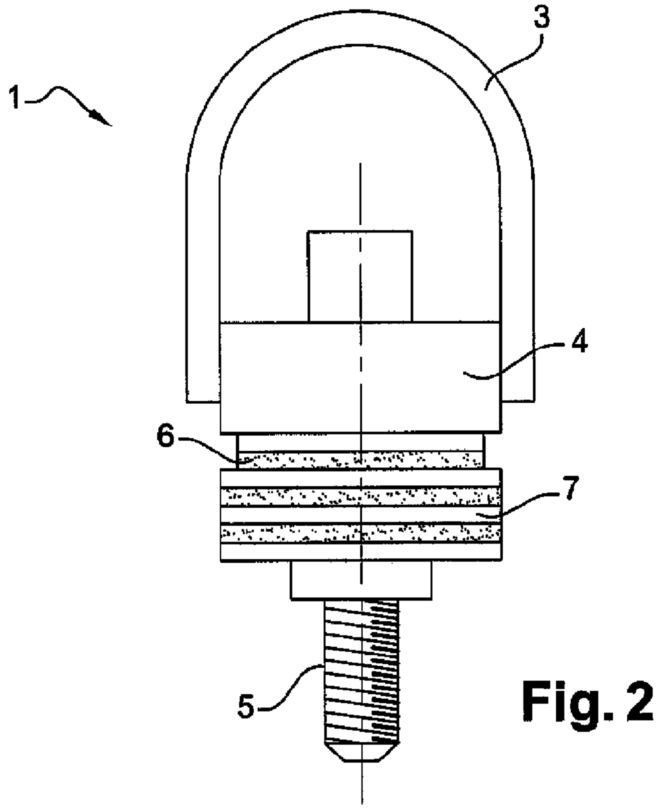
FIG. 2 is a plan view of the handling device according to the present disclosure.

Referring to FIG. 2, the handling device 1 according to the present disclosure comprises in its upper part gripping means such a substantially U-shaped ring 3, intended to be connected to a lifting device by means of a lifting sling.

The ring 3 is closed in its lower part by a base 4 comprising in a direction substantially perpendicular to its surface a threaded hole receiving a threaded screw 5 along its full length.

The assembly constituted by the ring 3, the base 4 and the screw 5 is called the screw assembly in the following description.

According to the present disclosure, a first screwing indicator element 6 is screwed onto the screw 5 and tightened on the lower part of the base 4, constituting a nut of said screw 5. The screw assembly and the first screwing indicator element are secured to one another.

The handling device 1 according to the present disclosure also comprises a second screwing indicator element 7, assembled on the first screwing indicator element 6 by the connecting means described herein after.

According to one form not shown, the body of the screw 5 is threaded only in its lower part over a length adapted to provide sufficient anchoring of the screw in the load to be handled to ensure a good support between the handling device according to the present disclosure and said load.

According to such a form, the first screwing indicator element is mounted on the screw and held clamped on the lower part of the base by any holding means making it secured to the screw assembly. Such a support can be achieved for example by glue, rivets, or other means known to the skilled person.

Figure 3:
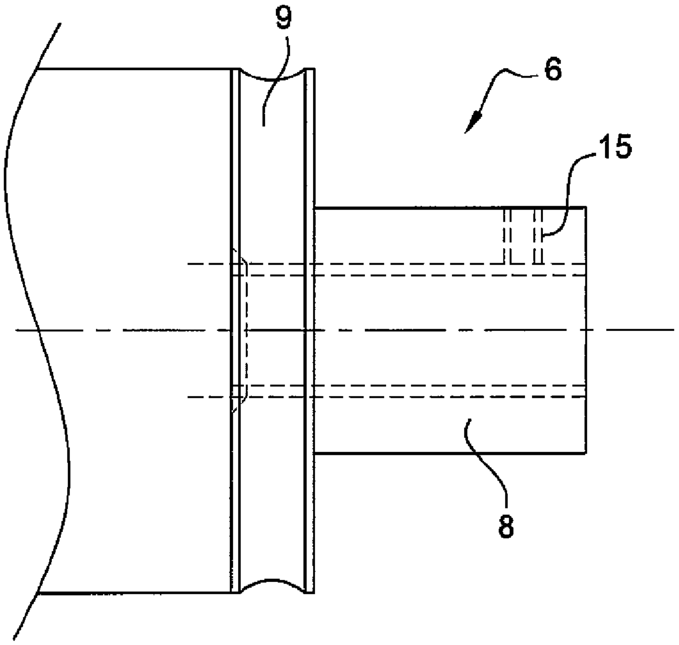
FIG. 3 is a plan view of the first screwing indicator element.
Figure 4:
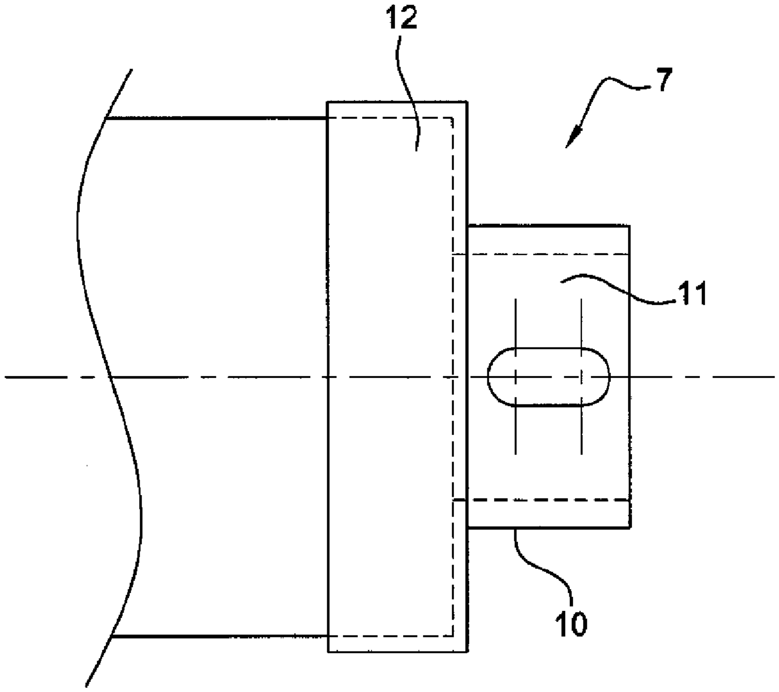
FIG. 4 is a plan view of the second screwing indicator element.

Referring now to FIGS. 3 and 4, the first screwing indicator element 6 comprises a tubular body 8 equipped with a flange 9 on its upper part.

The tubular body 8 of the first screwing indicator element 6 comprises on its internal face a thread shaped to be screwed onto the screw 5 of the screw assembly.

The second screwing indicator element 7 is shaped like a tubular sleeve 10 of a length substantially equal to that of the tubular body 8.

The second screwing indicator element 7 is intended to be mounted on the first screwing indicator element 6. To this end, the tubular sleeve 10 necessarily has a larger diameter than the tubular body 8.

In fact, the tubular sleeve 10 has two different diameters, the lower part 11 of the sleeve 10 being of a smaller diameter than the upper part 12 of the sleeve 10.

Furthermore, the diameter of the upper part 12 of the sleeve 10 is greater than that of the flange 9 defining the upper part of the tubular body 8.

With this arrangement, the tubular sleeve 10 forming the second screwing indicator element is adapted to cover the entire length of the tubular body 8 constituting the first screwing indicator element, during the assembly of first and second screwing indicator elements.

Furthermore, the first and second screwing indicator elements are held together by an element providing, on the one hand, a translational locking in a direction substantially parallel to the axis of the screw 5 and, on the other hand, a rotational locking.

Figure 5:
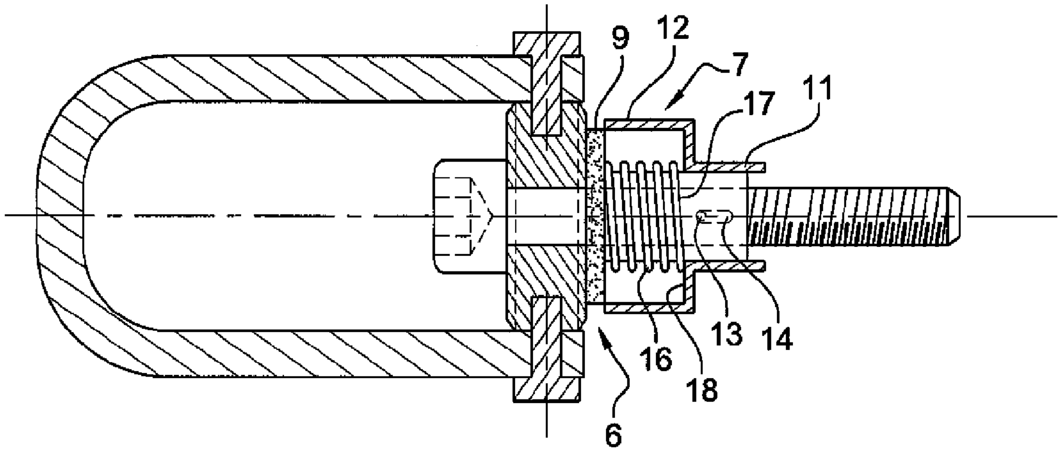
FIG. 5 is a sectional view of the handling device according to the present disclosure, in a rest position.

As shown in FIG. 5, this locking is achieved by a grub screw 13 fitted into a slot 14 in the lower part 11 of the sleeve 10 of the second screwing indicator element 7.

A threaded hole 15 receiving the screw 13 is formed on the tubular body 8 of the first screwing indicator element, in a direction substantially perpendicular to the axis of revolution of said tubular body 8.

Locking can of course be achieved by any other means known to those skilled in the art.

The upper part 12 of tubular sleeve 10 of the second screwing indicator element 7 includes resilient return means such as a spring 16, as shown in FIG. 5. The lower part 17 of said spring 16 rests against a shoulder 18 formed by the lower 11 and upper 12 parts of the tubular sleeve 10 and the upper part 19 of said spring 16 rests against the flange 9 of the first screwing indicator element 6.

The operation of the device according to the present disclosure is described below, with reference to FIGS. 5 and 6.

FIG. 5 illustrates the device in the so-called rest position, corresponding either to a situation wherein this device is not connected to any load to be handled, or a situation wherein the device is screwed onto the item to be handled, but screwing between these two elements remains insufficient to provide that the item to be handled will not pull away from the handling device.

The spring 16, in an extended position, tends to push the second screwing indicator element 7, movable in translation relative to said first screwing indicator element 6, in the direction of the lower part 10 of the handling device assembly 1.

The extended position of the spring 16, thus tending to move the second screwing indicator element 7 away from the upper part of the handling device 1, makes it possible, in a rest position of the device as defined above, to permanently uncover the flange 9 of the first screwing indicator element 6.

Typically, an operator who is preparing to handle a load screws manually the handling device 1 onto the load to be handled.

In case of insufficient screwing of the handling device into the load to be handled, corresponding to a rest position of said handling device, the spring 16 is in the extended position and holds the second screwing indicator element 7 in abutment against the load to be handled.

The flange 9 of the first screwing indicator element 6 remains then uncovered.

The operator is then informed that the handling device 1 is in a rest position and said load is clearly poorly secured onto said device.

According to an advantageous form of the present disclosure, the flange 9 is red colored, which makes it possible to draw the operator's attention to the fact that the handling device 1 is poorly secured onto the load and that the latter may be torn if the anchoring of screw 5 into the load is not lengthened.

As described above, an operator who is preparing to handle a load C screws manually the handling device 1 on the load C to be handled.

The spring 16 then acts in tension during the screwing operation, and tends to push the second screwing indicator element 7, movable in translation relative to said first screwing indicator element 6, in direction of the lower part of the handling device assembly 1.

Within a certain distance of the anchoring of the screw 5 in the load C, the spring 16, acting in tension, holds the second screwing indicator element 7 in abutment against the load C.

At this phase of the insertion of the screw 5 into the load C, the spring 16 is not fully compressed and the flange 9 of the first screwing indicator element 6 is still partially or totally uncovered.

Figure 6:
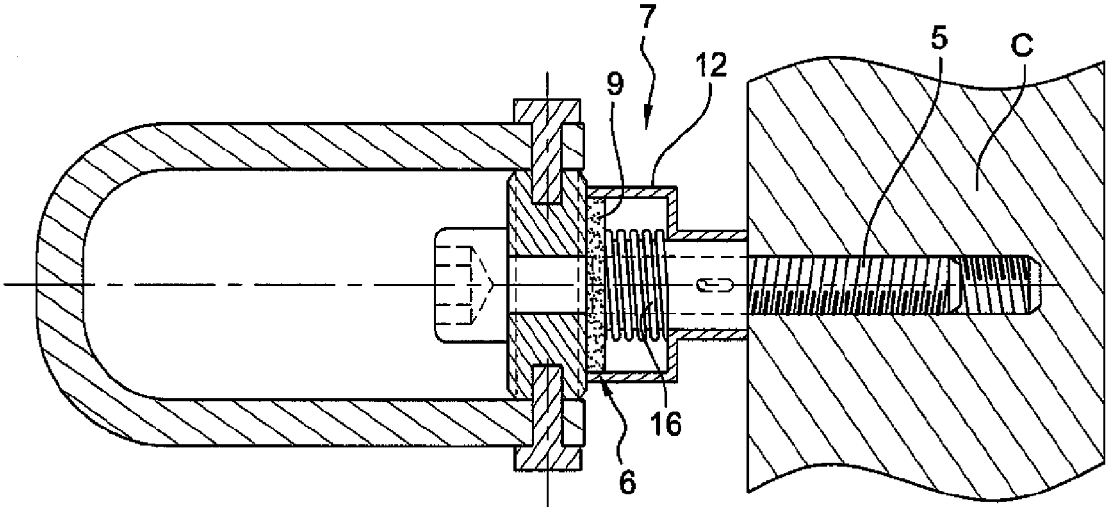
FIG. 6 is a sectional view of the handling device according to the present disclosure, in a clamped position.

Referring now to FIG. 6, said figure illustrates an operation of the handling device according to the present disclosure in said clamped position, corresponding to a situation wherein the handling device is sufficiently screwed onto the piece to be handled, that is to say, the anchoring of the screw 5 into the load C is deep enough to provide that the item to be handled cannot be torn off during the load C handling phase.

The second screwing indicator element 7, in abutment against the load C, creates a barrier to the penetration of the screw assembly secured to the first indicator screwing element 6.

The spring becomes compressed, and allows the flange 9 of the first screwing indicator element 6 to penetrate inside the upper part 12 of the sleeve 10 of the second screwing indicator element 7.

In such a situation, there is coincidence between the flange 9 of the first screwing indicator element 6 and the second screwing indicator element 7, that is to say, the flange 9 is no longer visible to the user.

The area defined by the tubular sleeve 10 of the second screwing indicator element 7 covers completely the first screwing indicator element 6.

The user then infers that the anchoring of the screw 5 of the handling device 1 into the load C to be handled is sufficiently deep. The load is then ready to be handled.

According to an advantageous form of the present disclosure, the upper part 12 of the sleeve 10 of the second screwing indicator 7 is green, which informs the operator, in a tight screwing situation, that the handling device is suitably secured to the load C and that the latter is not likely to come off during the handling operation.

With the present disclosure, the user is provided with a safe handling device.

With this simple-to-implement and cost effective device, the user is provided with a means to provide that the load is secured to the handling device and unlikely to come off during normal use of the lifting assembly.

It goes without saying that the present disclosure is not limited only to the forms of the handling device described above as examples, but it encompasses all the alternatives.

What is claimed is:

1. A device for handling a load provided with at least one thread, the device comprising:

- a screw assembly equipped with gripping means and capable of connecting to said load;
- a first screwing indicator element secured to said screw assembly;
- a second screwing indicator element movable at least in translation relative to said first screwing indicator element; and
- resilient return means configured to return the second screwing indicator element to abut against said load, said resilient return means being inserted between the first screwing indicator element and the second screwing indicator element, wherein a lower part of the resilient return means rests against a shoulder formed by the second screwing indicator element, and an upper part of the resilient return means rests against a flange of the first screwing indicator element, and wherein the flange of the first screwing indicator element is covered by the second screwing indicator element and is not visible in a compressed position of the resilient return means, so that the device indicates a sufficient screwing of the device onto said load.

2. The device according to claim 1, wherein the second screwing indicator element contains the resilient return means.

3. The device according to claim 1, wherein the second screwing indicator element comprises at least one area shaped to cover the first screwing indicator element when the second screwing indicator element abuts against said load and the screwing between the device and said load is sufficient.

4. The device according to claim 1, wherein the gripping means form a substantially U-shaped ring closed by a base, said base being provided with at least one threaded hole adapted to receive at least one screw on a body of which the first screwing indicator element is mounted.

5. The device according to claim 1, wherein the first and second screwing indicator elements have different colors.

* * * * *